United States Patent
Irving et al.

(10) Patent No.: US 7,339,007 B2
(45) Date of Patent: *Mar. 4, 2008

(54) LOW SEDIMENT PROCESS FOR THERMALLY REACTING HIGHLY REACTIVE POLYMERS AND ENOPHILES

(75) Inventors: Matthew David Irving, Fairford (GB); Robert William Shaw, Abingdon (GB); Jeremy Roger Spencer, Didcot (GB); Jacob Emert, Brooklyn, NY (US)

(73) Assignee: Infineum International Limited (GB)

( * ) Notice: Subject to any disclaimer, the term of this patent is extended or adjusted under 35 U.S.C. 154(b) by 89 days.

This patent is subject to a terminal disclaimer.

(21) Appl. No.: 10/600,302

(22) Filed: Jun. 20, 2003

(65) Prior Publication Data

US 2004/0260032 A1 Dec. 23, 2004

(51) Int. Cl.
*C08C 19/28* (2006.01)
*C08F 8/46* (2006.01)

(52) U.S. Cl. ............... 525/333.9; 525/333.7; 525/343; 525/346; 525/349; 525/384; 525/386; 525/375; 525/379; 528/486; 528/487; 528/492

(58) Field of Classification Search ............ 525/333.7, 525/343, 346, 349, 384, 386, 333.9, 375, 525/379; 528/486, 487, 492
See application file for complete search history.

(56) References Cited

U.S. PATENT DOCUMENTS

| | | | |
|---|---|---|---|
| 3,087,936 A | 4/1963 | Le Suer | 260/326.3 |
| 3,254,025 A | 5/1966 | Le Suer | 252/32.7 |
| 3,381,022 A | 4/1968 | Le Suer | 260/404.8 |
| 3,412,111 A | 11/1968 | Irwin et al. | 260/346.8 |
| 3,960,900 A | 6/1976 | Puskas et al. | 260/346.8 R |
| 4,029,592 A | 6/1977 | Puskas et al. | 252/182 |
| 4,086,251 A * | 4/1978 | Cengel et al. | 549/255 |
| 4,102,798 A | 7/1978 | Ryer et al. | 252/51.5 A |
| 4,113,639 A | 9/1978 | Lonstrup et al. | 252/51.5 A |
| 4,116,876 A | 9/1978 | Brois et al. | 252/49.6 |
| 4,152,499 A | 5/1979 | Boerzel et al. | 526/52.4 |
| 4,234,435 A | 11/1980 | Meinhardt et al. | 252/51.5 A |
| 4,235,786 A | 11/1980 | Wisotsky | 260/346.74 |
| 4,605,808 A | 8/1986 | Samson | 585/525 |
| 4,857,217 A | 8/1989 | Gutierrez et al. | 252/47 |
| 4,927,551 A | 5/1990 | Erdman et al. | 252/42.7 |
| 4,938,881 A | 7/1990 | Ripple et al. | 252/32.7 E |
| 4,956,107 A | 9/1990 | Gutierrez et al. | 252/47 |
| 4,963,275 A | 10/1990 | Gutierrez et al. | 252/47 |
| 5,053,152 A | 10/1991 | Steckel | 252/51.5 R |
| 5,225,092 A | 7/1993 | Emert et al. | 252/50 |
| 5,229,022 A | 7/1993 | Song et al. | 252/56 R |
| 5,230,714 A | 7/1993 | Steckel | 44/432 |
| 5,241,003 A | 8/1993 | Degonia et al. | 525/123 |
| 5,266,223 A | 11/1993 | Song et al. | 252/51.5 A |
| 5,430,105 A | 7/1995 | Redpath et al. | 525/285 |
| 5,565,128 A | 10/1996 | Gutierrez | 508/542 |
| 5,674,819 A * | 10/1997 | Sivik et al. | 508/234 |
| 5,674,955 A | 10/1997 | Kerr et al. | 526/77 |
| 5,756,431 A | 5/1998 | Emert et al. | 508/293 |
| 5,777,025 A | 7/1998 | Spencer et al. | 524/745 |
| 5,792,730 A | 8/1998 | Gutierrez et al. | 508/232 |
| 5,854,186 A | 12/1998 | Cusumano et al. | 508/554 |

FOREIGN PATENT DOCUMENTS

| | | |
|---|---|---|
| EP | 0 319 809 A2 | 6/1989 |
| EP | 0 208 560 B1 | 1/1993 |
| EP | 0 587 381 A1 | 3/1994 |
| EP | 0 359 316 B1 | 1/1995 |
| EP | 0 744 393 A1 | 11/1996 |
| EP | 744393 A1 * | 11/1996 |
| EP | 0 899 276 A1 | 3/1999 |
| EP | 0 987 278 A1 | 3/2000 |
| EP | 1 010 746 A1 | 6/2000 |
| EP | 1 489 107 A2 | 12/2004 |
| GB | 989409 | 4/1965 |
| WO | WO98/31718 A1 | 7/1998 |
| WO | WO01/19873 A1 | 3/2001 |

* cited by examiner

*Primary Examiner*—Roberto Rabago

(57) ABSTRACT

A process for forming an ene reaction product wherein an enophile, such as maleic anhydride, is reacted with reactive polyalkene having a terminal vinylidene content of at least 30 mol. %, at high temperature in the presence of a free radical inhibitor. The polyalkenyl acylating agents are useful per se as additives in lubricating oils, functional fluids, and fuels and also serve as intermediates in the preparation of other products (e.g., succinimides) useful as additives in lubricating oils, functional fluids, and fuels. The presence of the free radical inhibitor during the high temperature reaction results in a reaction product that is low, or substantially free from sediment.

16 Claims, No Drawings

LOW SEDIMENT PROCESS FOR THERMALLY REACTING HIGHLY REACTIVE POLYMERS AND ENOPHILES

FIELD OF THE INVENTION

The invention relates to a low-sediment, thermal process for preparing oil-soluble polyalkenyl acylating agent by reaction of highly reactive polyalkene and an enophile, in the presence of a free radical inhibitor. More specifically, the invention is directed to a process wherein an enophile such as maleic anhydride, is reacted with reactive polyalkene having a terminal vinylidene content of at least 30 mol. %, at high temperature in the presence of a free radical inhibitor. The polyalkenyl acylating agents are useful per se as additives in lubricating oils, functional fluids, and fuels and also serve as intermediates in the preparation of other products (e.g., succinimides) useful as additives in lubricating oils, functional fluids, and fuels. The presence of the free radical inhibitor during the high temperature reaction results in a reaction product that is low in, or substantially free from sediment.

BACKGROUND OF THE INVENTION

Polyalkenyl acylating agents, most notably polyisobutenyl succinic acids and anhydrides, are known intermediates for the preparation of products useful as additives in lubricants, fuels, and functional fluids. In particular, succinamide and succinimide products produced by the reaction of monoamines or polyamines with polyalkenyl succinic anhydrides have been employed as ashless dispersants and detergent additives in lubricating oils and in fuels. Succinic esters produced by the reaction of monoalcohols or polyols with polyalkenyl succinic anhydrides have also been used as ashless dispersants and detergents.

Polyalkenyl acylating agents have previously been prepared using a one-step halogen-assisted reaction process in which a polyalkene and an enophile are reacted at elevated temperature in the presence of chlorine. Such materials have also been prepared using a two-step halogen-assisted process in which the polyalkene is chlorinated in the first step and the resulting chlorinated polyalkene is then reacted with the enophile at elevated temperature. Both the one- and two-step chloro processes can produce polyalkenyl acylating agents in relatively high yields. However, these products typically contain residual chlorine, and environmental concerns related to chlorine-containing materials make the use of the chloro processes undesirable.

The polyalkenyl acylating agents have also been prepared by the direct thermal reaction of a polyalkene and an enophile, often referred to in the art as the thermal (or "ene") process. While the thermal process has the advantage of avoiding the use of chlorine, the reaction tends to proceed only slowly and with low yields at reaction temperatures below about 150° C. At higher reaction temperatures, the yield of the thermal process typically improves, but remains below those achieved by the halogen-assisted reaction process.

Improved thermal process yields have been achieved using polyalkene reactants having a relatively high proportion of terminal double. Terminal double bonds, particularly terminal vinylidene bonds, in polyalkenes are recognized to be generally more reactive in the thermal process than internal double bonds. U.S. Pat. No. 4,152,499, for example, discloses that adduct formation between maleic anhydride and polyisobutene occurs virtually only between maleic anhydride and a terminal double bond. U.S. Pat. No. 4,152,499 further discloses that double bonds in the β position are also capable of reacting to a certain degree, while virtually no reaction occurs at double bonds further removed from the chain ends. U.S. Pat. No. 4,086,251 discloses that terminal vinylidene is believed to be the most reactive of the terminal double bonds in polybutenes. Conventional polyisobutenes, formed by cationic polymerization using aluminum chloride catalysts such as $AlCl_3$, generally have a relatively low content of terminal double bonds. Polyisobutenes having a high content of terminal double bonds, so-called "reactive" polyisobutenes, have been achieved by $BF_3$-catalyzed polymerization of isobutene. Other polyalkenes having a high content of terminal double bonds (e.g., ethylene-α-olefin copolymers and α-olefin homo- and copolymers) prepared by polymerization of the corresponding monomers in the presence of metallocene catalyst systems have also been disclosed.

Both the halogen-assisted and thermal reactions described above also tend to produce significant amounts of a sediment byproduct which must be filtered from the final product prior to its use as an additive or intermediate. The thermal process also tends to produce tars, which coat the reactor walls, necessitating frequent, time-consuming, and therefore costly clean-ups of the reactor vessel. Sediment and tar formation is believed to be due, at least in part, to the decomposition and/or polymerization of the unsaturated enophile, which has typically been maleic anhydride.

U.S. Pat. No. 3,412,111 describes a process for reacting olefin monomer with maleic anhydride in the presence of either a hydroxyl aromatic compound, or an amino aromatic in order to prevent an unwanted olefin polymerization side reaction. Similar disclosures are made in each of EP-A-0 319 809 A2 and EP-A-0 359 316 B1.

U.S. Pat. Nos. 3,960,900; 4,029,592 and 4,086,251 describe the halogen-assisted reaction of polybutene and maleic anhydride in the presence of a halogenated hydrocarbon and other halogenated compounds wherein yield was improved and tar formation was decreased. U.S. Pat. No. 3,960,900 further describes the use of phenothiazine, in combination with the halogenated hydrocarbon or compound. It is noted that the use of phenothiazine alone is able to reduce tar and increase yield somewhat, but that these improvements are not as great as when the phenothiazine and halogenated hydrocarbon or compound are used simultaneously. No effect on sediment is suggested, and the patent notes that the final product must be filtered.

In association with the practice of the thermal reaction the use of certain additives to reduce the formation of tars and sediments is known. For example, U.S. Pat. No. 4,235,786 discloses that sediment formation in the thermal reaction can be markedly reduced by the presence of a sediment-reducing amount of an oil-soluble strong organic acid. The patent discloses that the oil-soluble strong organic acid is preferably a $C_{15}$-$C_{70}$ optimally $C_{28}$-$C_{36}$ hydrocarbyl substituted sulfonic acid. U.S. Pat. No. 5,777,025 describes a process in which a thermal reaction is conducted at elevated temperature and pressure in the presence of a sediment-inhibiting amount of an oil soluble hydrocarbyl-substituted sulfonic acid.

While the use of the thermal reaction and highly reactive polymer has been found to reduce tar and sediment formation, and the presence of sulfonic acid has been found to further ameliorate tar and sediment formation, there remains a continuing need for improved thermal processes that completely eliminate, or further reduce the amount of sediments and/or tars, most particularly sediment, such that the filtration of the reaction product is more easily accomplished, or becomes unnecessary.

SUMMARY OF THE INVENTION

In accordance with a first aspect of the invention, there is provided a low sediment-producing process for producing polyalkenyl acylating agent, wherein highly reactive polymer is thermally reacted with an enophile in the presence of an amount of free radical inhibitor effective to reduce or eliminate sediment formation.

In accordance with a second aspect of the invention there is provided a process as in the first aspect, wherein the reacting group of the enophile is olefinic or carbonyl, and the free radical inhibitor comprises a phenothiazine nucleus.

In accordance with a third aspect of the invention, there is provided a process, as in the first or second aspect, wherein the reactive polymer is highly reactive polybutene or polyisobutene having a $M_n$ of 900 to 2500, and the enophile is maleic anhydride.

In accordance with a fourth aspect of the invention, there is provided a process, as in the first, second or third aspect, wherein the reaction is conducted in the further presence of an amount of an oil soluble sulfonic acid effective to reduce tar formation.

These and other objects, advantages and features of the present invention will be better understood by reference to the following detailed description of the preferred embodiments.

DETAILED DESCRIPTION OF THE INVENTION

The process of the invention involves the thermal reaction of a reactive polymer with an enophile, in the presence of a sediment-inhibiting amount of a free radical inhibitor, and optionally, a hydrocarbyl substituted sulfonic acid. While it has been found that free radical inhibitors have only a minor effect on sediment, relative to, for example, sulfonic acid, when used in the halogen-assisted reaction of a conventional polyalkene and an enophile, these free radical inhibitors, when used in a thermal reaction of an enophile and reactive polyalkene, are highly effective at reducing sediment formation, leading to a reaction product that is substantially sediment free and can be used, in many cases, without filtration.

Reactive polyalkenes are differentiated from conventional polyalkenes by terminal vinylidene content. A polyalkene chain having a terminal vinylidene group (also referred to in the art as a terminal ethenylidene group) can be represented as POLY—$C(R)$=$CH_2$, wherein R is an alkyl group, the identity of which depends upon the monomer units from which the polyalkene is derived (e.g., R is methyl for polyisobutene), and POLY is the remainder of the polyalkene chain. The percentage of the polymer chains having terminal vinylidene and the percentages of other types of olefin unsaturation can be determined by proton, or carbon-13, NMR. Polyalkenes having at least about 30% (e.g., 40 to 100%) terminal vinylidene chains are classified as reactive polyalkenes, because such polyalkenes tend to have a higher reactivity when employed in a thermal process, relative to the analogous "conventional" polyalkene having a terminal vinylidene content of less than 30%.

Preferred polyalkenes include reactive polyisobutenes (i.e., homopolymers of isobutene) and reactive polybutenes. The reactive polyisobutenes and polybutenes preferably have at least about 50% (e.g., 50 to 95%) and more preferably at least about 60% (e.g., 60 to 99%) terminal vinylidene chains. These reactive polyisobutenes and polybutenes are formed via cationic polymerization using a boron trifluoride, and preferably a polar co-catalyst such as water or alcohol, and a shortened polymerization time. Methods by which reactive polyisobutenes and polybutenes can be prepared are described in more detail, for example, in U.S. Pat. Nos. 4,152,499; 4,605,808; 5,674,955 and WO 01/19873 Al. HR-PIB is commercially available under the tradenames Glissopal™ (from BASF), Ultravis™ (from BP-Amoco) and TPCxxxx, wherein xxxx represents various numbers indicative of molecular weight (from Texas Petrochemicals L.P.).

Other preferred polyalkenes are reactive α-olefin homopolymers, α-olefin copolymers, and ethylene-α-olefin copolymers; i.e., those in which at least about 30% of the polymer chains possess terminal vinylidene bonds. Preferably, at least 50%, more preferably at least 60%, and most preferably at least 75% (e.g., 75 to 98%) of such polymer chains exhibit terminal vinylidene unsaturation.

The reactive α-olefin homo- and copolymers are respectively polymers of one and of at least two $C_3$ to $C_{12}$ α-olefin(s) having the formula $CH_2$=$CHR'$, wherein R' is a straight or branched chain alkyl radical comprising 1 to 10 carbon atoms. The unsaturated ethylene-α-olefin copolymers are polymers of ethylene and at least one α-olefin of the above formula. The α-olefins employed in the foregoing homo- and copolymers are more preferably selected from the $C_3$ to $C_6$ α-olefins of the above formula, R' being a straight or branched chain alkyl of from 1 to 4 carbon atoms. Accordingly, useful α-olefin monomers and comonomers include, for example, propene, butene-1, hexene-1, octene-1,4-methylpentene-1, decene-1, dodecene-1, and mixtures thereof (e.g., mixtures of propene and butene-1). Exemplary of such polymers are propene homopolymers, butene-1 homopolymers, ethylene-propene copolymers and the like. Preferred polymers are those derived from ethylene and the $C_3$ and $C_4$ α-olefins of the above formula; i.e., polyethylene, polypropene, polybutene-1, and copolymers of ethylene and propene, ethylene and butene-1, butene-1 and propene, and ethylene and propene and butene-1.

The molar ethylene content of the unsaturated ethylene copolymers employed in the process of this invention is preferably in the range of from about 20 to 80%, and more preferably from about 30 to 70%. When propene and/or butene-1 are employed as the comonomer(s) with ethylene, the ethylene content of such copolymers is most preferably between about 45 and 65%, although higher or lower ethylene contents may be present.

Reactive α-olefin homopolymers, α-olefin copolymers, and ethylene-α-olefin copolymers may be prepared by polymerizing an α-olefin monomer, or mixtures of α-olefin monomers, or mixtures comprising ethylene and at least one (X-olefin monomer, in the presence of a catalyst system comprising at least one metallocene (e.g., a cyclopentadienyl-transition metal compound) and an aluminoxane compound. Suitable methods for preparing these polymers are disclosed in, for example, U.S. Pat. Nos. 5,266,223 and 5,225,092. Reactive ethylene-α-olefin copolymers may be characterized by the formula POLY—$C(R')$=$CH_2$ wherein R' is as defined earlier and wherein POLY represents the polymer chain. The chain length of the R' alkyl group will vary depending upon the comonomer(s) selected for use in the polymerization. A minor amount of the polymer chains can contain terminal ethenyl (i.e., vinyl) unsaturation, i.e., POLY—CH=$CH_2$, and a portion of the polymers can contain internal monounsaturation, e.g., POLY—CH=CH (R'). Other suitable copolymers include those in which a minor amount of the copolymer (e.g., 1 to 20 mol. %) is derived from a $C_4$ to $C_{18}$ nonconjugated diolefin such as EPDM. EPDM copolymers include copolymers of ethylene and propylene with dicyclopentadiene, with ethylidene norbornene and with 1,4-hexadiene.

While the polyalkenes are generally hydrocarbon polyalkenes, suitable polyalkenes can contain non-hydrocarbon moieties such as lower alkoxy (lower is defined as groups having up to 7 carbon atoms), lower alkyl mercapto, hydroxy, mercapto and carbonyl, provided that the non-hydrocarbon moieties do not substantially interfere with the process of the invention; i.e., they do not interfere with the thermal reaction between the polyalkene and the enophile. The non-hydrocarbon moieties can be introduced into the polyalkene by employing polymerizable olefin monomers containing non-hydrocarbon substituents in the preparation of the polyalkene.

The polyalkenes have a number average molecular weight in the range of from about 300 to 5000 (e.g., 700 to 4000), preferably from about 450 to 3000 (e.g., 700 to 2500), and more preferably from about 900 to 2500 (e.g., 1000 to 2300). Number average molecular weight ($M_n$) can be determined by several known techniques such as gel permeation chromatography ("GPC"), vapor phase osmometry, proton NMR and carbon-13 NMR. GPC additionally provides molecular weight distribution ("MWD") information, also referred to in the art as polydispersity, which is determined by the ratio of weight average molecular weight ($M_w$) to $M_n$. MWD is not a critical aspect of the starting hydrocarbon polymer for the process of this invention. Typically, however, the polyalkenes have MWD of less than about 6. Particularly preferred polyalkenes are reactive polyisobutenes and polybutenes having a number average molecular weight ($M_n$) of from about 300 to about 5000 (e.g., 450 to 3000), more preferably from about 900 to 2500.

The preferred enophiles are those having an olefinic or carbonyl reacting group. Enophiles having carbonyl reacting groups are described, for example, in U.S. Pat. Nos. 5,057, 564; 5,274,051; 5,288,811; 6,077,915; and 6,462,140; as well as U.S. Pat. Nos. 5,786,490; 5,777,142; 5,779,742; 5,620,949; and 6,020,500, which are directed specifically to polyolefins functionalized with glyoxylic acid. More preferred enophiles comprise mono- and dicarboxylic acid material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono- or diesters of (iii). Mixtures of monounsaturated carboxylic materials (i) to (iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate. A particularly preferred enophile is maleic anhydride.

Free radical inhibitors useful in the practice of the present invention include phenol compounds such 2,6-di-tert-butylphenol, 2,4,6-tri-tert-butylphenol, 2,6-di-tert-butyl-4-methylphenol, 2,6-di-tert-butyl-4-ethylphenol, o-tert-butylphenol, 2-methyl-6-tert-butylphenol, 2,4,6-tri-tert-octylphenol, 2,4-dimethyl-6-tert-butylphenol, 2-tert-butyl-6-(α-methylbenzyl)phenol, 2,6-di(α-methylbenzyl)phenol, 2,4-di(α,α-dimethylbenzyl)phenol, 2,4-di-tert-octyphenol, 2,4,6-tri(a-methylbenzyl)phenol, 2,6-di-tert-butyl-4-hydroxy anisole, 2,6-di-tert-butyl-4-methoxyphenol, 2-methyl-6-cyclohexylphenol, 2,6-di-tert-α-dimethylamino-p-cresol), 2,6-di-tert-octyl-4-decoxyphenol, 2-tert-butyl-4-chlorophenol, 2,6-di-tert-butyl-4(N,N'-dimethylaminomethylphenol), 2,2'-methylene-bis(4-methyl-6-tert-butylphenol), 2,2'-methylene-bis(4-ethyl-6-tert-butylphenol), 2,2'-methylene-bis(4-methyl-6-nonylphenol), 2,2'-isobutylenebis(4,6-dimethylphenol), 2,2'methylenebis(4-methyl-6-cyclohexylphenol), 4,4'methylenebis(2,6-di-tert-butylphenol), 4,4'-bis(2,6-di-tert-butylphenol), 4,4'-bis(2-methyl-6-tert-butylphenol), 4,4'-butylenebis-(3-methyl-6-tert-butylphenol), 4,4'-isopropylidenebis(2,6-di-tert-butylphenol), 2,2'thiobis(4-methyl-6-tert-butylphenol), 4,4'-thiobis(2-methyl-6-tert-butylphenol), 4,4'-thiobis(3-methyl-6-tert-butylphenol), n-octadecyl-β-(4'-hydroxy-3'-5'-di-tert-butylphenol), propionate, bis(3-methyl-4-hydroxy-5-tert-butylbenzyl)sulfide, bis(3,5-di-tert-butyl-4-hydroxybenzyl) sulfide, and the like; phosphorus compounds, such as tri (nonylphenyl) phosphate, tridecyl phosphite, distearylpentaerithityl diphosphite, and the like; naphthol-based compounds, such as 1,2-dihydroxynaphthalene, 1-amino-2-naphthol, 1-nitro-2-naphthol, etc.; amine compounds, such as trimethylamine, phenyl-β-naphthylamine, p-phenylenediamine, mercaptoethylamine, N-nitrosodimethylamine, benzotriazoles, phenothiazine, halo-dihydro-2,2,4-trimethylquinone, and the like; or sulfur compounds, such as dilaurylthio dipropionate, dilauryl sulfide, 2-mercaptobenzimidazole, 2-mercaptobenzothiazole, dibenzothiazyl disulfide, metallic salts of 2-mercaptobenzothiazole, diethylxanthogene disulfite, etc.; quinoline compounds such as hydroquinone, urea compounds, etc. The above list is not intended to be exhaustive; numerous classes of compounds that inhibit formation of free radicals in organic materials are well known, and can be used in the practice of the present process. The free radical inhibitor can be a single compound, or a mixture of combination of such compounds. The preferred free radical inhibitors are the amine compounds, more preferably phenothiazine and substituted phenothiazine, most preferably phenothiazine.

Sulfonic acids useful in the practice of the present invention are oil soluble hydrocarbyl substituted sulfonic acids. The term "oil soluble" refers here to a hydrocarbyl substituted sulfonic acid which is at least 50 wt. % soluble in mineral oil at 20° C. The hydrocarbyl sulfonic acid may be a natural or synthetic sulfonic acid, such as a mahogany or petroleum alkyl sulfonic acid, an alkyl sulfonic acid or an alkaryl sulfonic acid, wherein the hydrocarbyl substituent (i.e., petroleum alkyl, linear and/or branched chain alkyl, alkaryl, and the like) imparts the oil solubility. Oil-soluble mahogany acids may be obtained by treating lubricating oil basestocks with concentrated or fuming sulfuric acid.

The hydrocarbyl substituent of the sulfonic acid can contain non-hydrocarbon groups such as nitro, amino, halo (e.g., chloro or bromo), lower alkoxy, lower alkyl mercapto, oxo (=O), thio (=S), imino (—NH—), ether (—O—), and thioether (—S—), provided the essentially hydrocarbon character of the substituent is retained for the purposes of this invention. When such non-hydrocarbon groups are present, they will generally represent no more than about 10 wt. % of the total weight of the atoms in the hydrocarbyl substituent.

The preferred hydrocarbyl substituent is alkaryl, and the preferred sulfonic acids are accordingly alkaryl sulfonic acids. Alkaryl sulfonic acids can be obtained by sulfonating alkyl substituted aromatic hydrocarbons such as those obtained from the fractionation of petroleum by distillation and/or extraction, or by the alkylation of aromatic hydrocarbons as, for example, those obtained by alkylating benzene, toluene, xylene, naphthalene, and biphenyl. Preferred alkaryl sulfonic acids include those obtained by the sulfonation of hydrocarbons prepared by the alkylation of benzene or toluene with tri-, tetra- or pentapropene fractions resulting from propene polymerization.

The alkaryl sulfonic acids typically contain from 15 to 76, preferably from 24 to 40, and more preferably from 28 to 36 total carbon atoms. The aryl moiety can be derived from any aromatic hydrocarbon such as benzene, napthalene, anthracene, biphenyl, and the like, but is preferably derived from benzene or naphthalene, and is most preferably derived from benzene. The preferred alkyl benzenesulfonic acids typically contain from 9 to 70, preferably from 18 to 34, more preferably from 22 to 30 total carbon atoms in the alkyl substituent (or substituents) in the aryl moiety. Particularly preferred is an alkylated benzenesulfonic acid having a number average molecular weight ($M_n$) of from 475 to 600 and an average of 2 alkyl groups wherein each of the alkyl groups contains an average of 11 to 15 carbon atoms.

The alkylated benzene used for preparing the sulfonic acid is obtained by known alkylation processes; e.g., the benzene can be reacted with a suitable alkene or oligomer or polymer thereof in the presence of boron trifluoride. Among the $C_9$ to $C_{70}$ alkylated benzenes which are preferably employed in the preparation of the sulfonic acid are nonylbenzene, dodecylbenzene, waxy alkylated benzenes, and benzenes alkylated with suitable branched chain polymers of up to 70 carbon atoms obtained from propene, butene, amylene or mixtures thereof or the like. Preferably, nonyl or dodecyl or either of their equivalents in a mixture of alkyls is employed in the preparation of the sulfonic acid.

The reaction between the reactive polyalkene and the enophile is conducted in the presence of the free radical inhibitor at a temperature of from about 180 to 300° C., preferably from about 210 to 250° C., and most preferably from about 220 to 245° C. (e.g., 225 to 235° C.), and under a pressure of from about 0 to 1000 kPag. Preferably, the reaction is conducted under a pressure of from about 0 to 700 kPag and more preferably from about 0 to 400 kPag. Where applied, partial pressure can be provided by charging the reactor with an inert gas. The inert gas can be any gas which does not interfere with the thermal ene reaction under the selected reaction time and conditions. The gas is typically selected from one of the noble gases (i.e., helium, neon, and argon, etc.), nitrogen, carbon dioxide, and carbon monoxide. The preferred inert gases are nitrogen and $CO_2$, and nitrogen is the most preferred. Because gaseous byproducts and/or gaseous decomposition products of the reactants usually, though not always, form during the course of the reaction (e.g., $CO_2$ from the decomposition of maleic anhydride), the total system pressure is typically higher than the inert gas partial pressure.

The reaction time can vary greatly depending upon such factors as the reactivity of the polyalkene, the degree of conversion desired, the selected reaction temperature, and so forth. Nonetheless, the reaction time is generally in the range of from about 1 to 30 hours, and is more typically from about 2 to 10 hours (e.g., 4 to 8 hours).

Where the enophile is a monounsaturated olefinic mono- or dicarboxylic acid or anhydride producing (hereinafter referred to as "CAP") compound, the reactive polyalkene and CAP compound are reacted together in a molar ratio of CAP compound to polyalkene of from about 0.9:1 to 3:1 (e.g., 1:1 to 2.5:1), and preferably in a mole ratio of from about 1.3:1 to 2.5:1 (e.g., 1.6:1 to 2.4:1). The free radical inhibitor is used in an amount of from about 10 to about 3000 ppm, preferably from about 10 to about 2000 ppm, more preferably from about 20 to about 500 ppm, based on the weight of reactive polyalkene charge.

The mixture of reactants and free radical inhibitor can be introduced into the reactor in any convenient manner prior to pressurizing (if any) and heating to reaction temperature. For example, they can be individually charged to the reactor concurrently or sequentially in any order; or can be mixed together in a separate mixing vessel, followed by charging the mixture to the reactor; or a mixture of the polyalkene and free radical inhibitor can be charged separately to the reactor, either concurrently with the charging of the enophile or sequentially in either order. Alternatively, the free radical inhibitor can be added to the reaction mixture in stages, with an initial amount of free radical inhibitor being added prior to, or upon initiation of the reaction, with further charges of free radical inhibitor being introduced, in one or more additional charges, during the reaction. However introduced, the polyalkene is normally in liquid form (e.g., polyalkenes which are normally solid at room temperature are introduced as a melt at higher temperatures). The free radical inhibitor is typically employed as a solid, liquid, or preferably, as a solution dissolved in one of the reactants in order to facilitate the mixing of the free radical inhibitor with the polyalkene.

In another preferred embodiment, the CAP compound is added to the reactor after a mixture of the polyalkene and free radical inhibitor are introduced therein and brought to reaction temperature, with the mixture being maintained at or near (e.g., within 10° C. of) reaction temperature during the addition of the CAP compound. Upon completing the addition of the CAP compound, the reactor can be pressurized with inert gas and held at reaction temperature for the selected reaction time.

In another preferred embodiment, the CAP compound is added to the reactor in stages, such that an initial charge of CAP compound is contacted with the polyalkene at or prior to the beginning of the reaction, and one or more additional charges of CAP compound are introduced into the resulting reaction mixture subsequent to the beginning of the reaction.

In another preferred embodiment, the reaction between the polyalkene and dicarboxylic acid producing compound is conducted in the further presence of from about 10 to about 3000 ppm, preferably from about 10 to about 2000 ppm by weight, more preferably from about 20 about 500 ppm, based on the weight of charged polyalkene, of an oil soluble sulfonic acid. As with the free radical inhibitor, the oil soluble sulfonic acid can be introduced, together with the mixture of the polyalkene and CAP compound into the reactor. Alternatively, the sulfonic acid can be charged to the reactor separately, be mixed together with the polyalkene in a separate mixing vessel, followed by charging the mixture to the reactor; or can be charged separately to the reactor, either concurrent with the charging of the CAP compound or sequentially in either order. However introduced, the sulfonic acid can be introduced as a solid or liquid, but is typically employed as a solution in an reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), inert solvent (e.g., mineral oil) in order to facilitate the mixing of the sulfonic acid with the polyalkene. In a particularly preferred method, at least some, preferably at least 50 wt. %, of the sulfonic acid is charged to the reactor after completion of at least about 50% of the reaction between the polyalkene and the enophile has been completed.

At the conclusion of the reaction, the resulting product mixture is normally treated to remove any unreacted CAP compound and/or volatile byproducts or decomposition products, such as by nitrogen stripping or by distillation with or without a vacuum. The product mixture typically contains the desired polyalkene derivative (i.e., polyalkenyl substituted dicarboxylic acid producing material) and at least some unfunctionalized polyalkene. The unfunctionalized polyalkene is normally not removed from the product mixture, because such removal is difficult and would be expensive to achieve on a commercial scale.

In a further preferred embodiment, at the conclusion of the reaction, the reaction mixture is allowed to cool to below 200° C.; an additional amount (e.g., about 1 to 10 wt. %, such as about 1 to 5 wt. %, based on the weight of polyalkene charged to the reactor) of the enophile (particularly maleic anhydride) is added, followed by stirring for a period of at least 0.2 hours, such as from about 0.3 to 6 hours, at a temperature of from about 120 to about 200° C. Excess enophile is then stripped, hydrocarbon solvent is added to reduce viscosity and assist in the precipitation of sediment, and the resulting mixture is filtered.

The product mixture can be characterized in terms of its functionality, which is the average number of moles of enophile reactant which have reacted per mole of polyalkene charged to the reaction, whether it has undergone functionalization or not. Functionality is based upon the saponification number ("SAP") of the product mixture and the $M_n$ of the polyalkene charged. SAP is the number of milligrams of KOH consumed in the complete neutralization of one gram of the resulting product mixture, and can be determined using ASTM D94. The sediment inhibiting effect of the free radical initiator is particularly apparent when the product mixture has a high SAP no. (e.g., SAP>48 mgKOH/g).

The average number of succinic groups per mole of product mixture obtained when reacting maleic anhydride with polyalkene is determined using the following formula:

$$F=(SAP \times M_n)/((112,200 \times A.I.)-(SAP \times 98))$$

wherein SAP is the saponification number; $M_n$ is the number average molecular weight of the starting olefin polymer; and AI is the percent active ingredient of the succinic-containing reaction product (the remainder being unreacted olefin polymer, maleic anhydride and diluent). The functionality of the polyalkenyl derivatives resulting from the process of the invention is typically at least about 0.5 and preferably at least about 0.7 (e.g., at least about 0.9). Functionality is typically in the range of from about 0.7 to 2 (e.g., 1 to 2). In one preferred embodiment the functionality is in a range from about 1 to 2 and preferably from about 1.3 to 1.7 (e.g., 1.3 to 1.5).

The product mixture can also be characterized in terms of its active ingredient ("AI"), which, as described above, is the weight fraction of reacted polyalkene based on the total weight of reacted and unreacted polyalkene. The AI of the resulting product mixture is typically at least about 0.65 (e.g., 0.65 to 0.80), preferably at least about 0.75 (e.g., 0.75 to 0.90), more preferably at least about 0.80 (e.g., 0.85 to 0.99). AI can be determined by separating the functionalized and unfunctionalized polymer components using column chromatography and then determining the weight fractions of the separated components.

The product mixture has little or no sediment. More particularly, the product has about 0.1 vol. % or less sediment and preferably less than 0.05 vol. % sediment (e.g., 0.005 to 0.05 vol. % sediment), as measured by dissolving or diluting 50 ml of the product in 50 ml of heptane, placing the solution in a calibrated centrifuge tube, centrifuging the tube for 20 minutes at a speed sufficient to give a relative centrifugal force of about 500 at the tip of the tube, and thereafter measuring the volume of sediment in the calibrated tube. The resulting product mixture normally has such insubstantial amounts of sediment that it can be used as an additive or a chemical intermediate without treatment to remove the sediment.

The products of the process of the invention are useful per se as additives in lubricating oils, fuels, and functional fluids, but are more typically employed as intermediates for producing additives. The polyalkenyl derivatives can, for example, be derivatized with a nucleophilic reactant, such as an amine, amino-alcohol, alcohol, metal compound, or mixture thereof, to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxy groups, alkoxy groups, amide groups, nitriles, imidazoline groups, and the like. Particularly useful amine compounds include mono- and polyamines, e.g., polyalkene and polyoxyalkylene polyamines of about 2 to 60, such as 2 to 40 (e.g., 3 to 20) total carbon atoms having about 1 to 12, such as 3 to 12, preferably 3 to 9, most preferably form about 6 to about 7 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,2-propylene)triamine. Such polyamine mixtures, known as PAM, are commercially available. Particularly preferred polyamine mixtures are mixtures derived by distilling the light ends from PAM products. The resulting mixtures, known as "heavy" PAM, or HPAM, are also commercially available. The properties and attributes of both PAM and/or HPAM are described, for example, in U.S. Pat. Nos. 4,938,881; 4,927,551; 5,230,714; 5,241,003; 5,565,128; 5,756,431; 5,792,730; and 5,854,186.

Other useful amine compounds include: alicyclic diamines such as 1,4-di(aminomethyl) cyclohexane and heterocyclic nitrogen compounds such as imidazolines. Another useful class of amines is the polyamido and related amido-amines as disclosed in U.S. Pat. Nos. 4,857,217; 4,956,107; 4,963,275; and 5,229,022. Also usable is tris (hydroxymethyl)amino methane (TAM) as described in U.S. Pat. Nos. 4,102,798; 4,113,639; 4,116,876; and UK 989,409. Dendrimers, star-like amines, and comb-structured amines may also be used. Similarly, one may use condensed amines, as described in U.S. Pat. No. 5,053,152. The functionalized polymer is reacted with the amine compound using conventional techniques as described, for example, in U.S. Pat. Nos. 4,234,435 and 5,229,022, as well as in EP-A-208,560.

A preferred dispersant composition is one comprising at least one polyalkenyl succinimide, which is the reaction product of a polyalkenyl substituted succinic anhydride (e.g., PIBSA) and a polyamine that has a coupling ratio of from about 0.65 to about 1.25, preferably from about 0.8 to about 1.1, most preferably from about 0.9 to about 1. In the context of this disclosure, "coupling ratio" may be defined as a ratio of the number of succinyl groups in the PIBSA to the number of primary amine groups in the polyamine reactant.

Low haze and low free-amine polyamine-derivatized polyalkenyl substituted succinic anhydrides are very difficult to obtain at low coupling ratios. It has been found that problems associated with haze and free amine content can be effectively addressed by modifying the rate and sequence of the amination reaction. Specifically, it has been found that a faster amination (a faster rate of polyamine reactant addition to the polyalkenyl substituted succinic anhydride solution) of less than about one hour, preferably 15 minutes or less, eliminates haze problems in dispersants that are provided by reacting polyamine and polyalkenyl substituted succinic anhydrides in a polyalkenyl substituted succinic anhydride to polyamine molar coupling ratio of less than about 1.0, such as less than about 0.9, preferably less than about 0.8. Cooling the polyamine-derivatized polyalkenyl substituted succinic anhydride solution'to less than 140° C., preferably to less than about 120° C., more preferably to about 60 to 110° C., and maintaining this temperature for at least about 5 hours, preferably from about 5 to about 720 hours, has been found to effectively reduce to low levels the amount of free amine.

The functionalized, oil-soluble polymeric hydrocarbon backbones may also be derivatized with hydroxyl compounds such as monohydric and polyhydric alcohols, or with aromatic compounds such as phenols and naphthols. Preferred polyhydric alcohols include alkylene glycols in which the alkylene radical contains from 2 to 8 carbon atoms. Other useful polyhydric alcohols include glycerol, monooleate of glycerol, monostearate of glycerol, monomethyl ether of glycerol, pentaerythritol, dipentaerythritol, and mixtures thereof. An ester dispersant may also be derived from unsaturated alcohols, such as allyl alcohol, cinnamyl alcohol, propargyl alcohol, 1-cyclohexane-3-ol, and oleyl alcohol. Still other classes of alcohols capable of yielding ashless dispersants comprise ether-alcohols, including oxy-alkylene and oxy-arylene. Such ether-alcohols are exemplified by ether-alcohols having up to 150 oxy-alkylene radicals in which the alkylene radical contains from 1 to 8 carbon atoms. The ester dispersants may be di-esters of succinic acids or acid-esters, i.e., partially esterified succinic acids, as well as partially esterified polyhydric alcohols or phenols, i.e., esters having free alcohols or phenolic hydroxy radicals. An ester dispersant may be prepared by any one of several known methods as described, for example, in U.S. Pat. No. 3,381,022.

When forming a dispersant product, the functionalized, oil-soluble polymeric backbone is typically derivatized in diluent oil. As lubricating oil compositions are increasingly being required to be low in sulfur, and the diluent oil remains associated with the dispersant product, it is preferable to use a low sulfur diluent oil, or more preferably, diluent oil that is substantially free (e.g. less than 2 wt. %, such as less than 1.5 wt. %) or completely free from sulfur.

The resulting dispersant(s) are preferably non-polymeric (e.g., are mono- or bis-succinimides) and may optionally be borated. Such dispersants can be borated by conventional means, as generally taught in U.S. Pat. Nos. 3,087,936, 3,254,025 and 5,430,105. Boration of the dispersant is readily accomplished by treating an acyl nitrogen-containing dispersant with a boron compound such as boron oxide, boron halide boron acids, and esters of boron acids, in an amount sufficient to provide from about 0.1 to about 20 atomic proportions of boron for each mole of acylated nitrogen composition.

EXAMPLES

The effect of the free radical inhibitor on the amount of sediment produced during a thermal reaction of a conventional polyalkene and an enophile was determined by thermally reacting conventional polyisobutene ("PIB"), and maleic anhydride ("MALA"), in varied MALA:PIB ratios, in both the presence and absence of phenothiazine. The PIB used in the following examples had a $M_n$ of about 950, and had a terminal vinylidene content of ≦5%. The results are shown below:

TABLE 1

| Example | MALA:PIB (molar ratio) | Phenothiazine (ppm) | Reaction Temp/Time (° C./hrs.) | SAP (mgKOH/g) | Sediment (wt. %) |
| --- | --- | --- | --- | --- | --- |
| Comp 1 | 1.26:1 | 0 | 235/5 | 78 | 2.2 |
| Comp 2 | 1.26:1 | 100 | 235/5 | 87 | 3.2 |
| Comp 3 | 1.26:1 | 300 | 235/5 | 65 | 1.6 |
| Comp 4 | 1.26:1 | 500 | 235/5 | 69 | 1.2 |

TABLE 1-continued

| Example | MALA:PIB (molar ratio) | Phenothiazine (ppm) | Reaction Temp/Time (° C./hrs.) | SAP (mgKOH/g) | Sediment (wt. %) |
|---|---|---|---|---|---|
| Comp 5 | 1.17:1 | 0 | 235/5 | 81 | 2 |
| Comp 6 | 1.17:1 | 100 | 235/5 | 87 | 2.4 |

As shown, in the thermal reaction of conventional PIB and MALA, the addition of 100 ppm of phenothiazine actually increased the amount of formed sediment. Increasing the amount of phenothiazine reduced the amount of sediment, although the total amount of sediment remained high (1.2 wt. % at 500 ppm phenothiazine). Increasing the amount of phenothiazine, above 100 ppm was shown to reduce the SAP of the reaction product.

The effect of the presence of phenothiazine, alone and in combination with sulfonic acid, in the thermal reaction of a reactive polyalkene and MALA was then determined using, as the reactive polyalkene, Glissopal 2300 (from BASF; 2300 $M_n$ PIB having a terminal vinylidene content of at least about 75%).

TABLE 2

| Example | Comp 7 | Inv 1 | Comp 8 | Inv 2 | Inv 3 | Comp 9 |
|---|---|---|---|---|---|---|
| MALA:PIB (molar ratio) | 2.25 | 2.25 | 2.0 | 2.0 | 2.0 | 2.0 |
| Reaction Temp/Time (° C./hrs.) | 230/5 | 230/5 | 230/5 | 230/5 | 230/5 | 230/5 |
| Phenothiazine (at t = 0) (ppm) | 0 | 125 | 0 | 80 | 80 | 0 |
| Sulfonic Acid (at t = 2.25) (ppm) | 0 | 0 | 0 | 0 | 80 | 80 |
| Sediment (wt. %) | 0.25 | 0.05 | 0.10 | <0.05 | <0.05 | 0.21 |
| Visual Reactor Fouling (%) | 25 | 5 | 20 | 0 | 10 | 25 |
| SAP (mgKOH/g) | 57.6 | 56.5 | 53.1 | 50.8 | 53.9 | 56.3 |
| AI (mass %) | 81.9 | 88.7 | 82.4 | 83.9 | 88.1 | 87.6 |

As shown by the data of Table 2, in the thermal reaction of reactive PIB and MALA, the presence of only a small amount of phenothiazine reduces the amount of sediment to or below 0.05 wt. %; reduces visual reactor fouling (indicative of the level of "tar" formation) and increases the AI of the reaction product (PIIBSA), with only a small reduction in SAP. The further addition of sulfonic acid ameliorates the noted reduction in SAP. Similar results are achieved when the phenothiazine is dissolved into the MALA prior to charging to the reactor and when the sulfonic acid is added to the reactor in stages, as shown in Table 3.

TABLE 3

| Example | Comp 10 | Inv 4 | Inv 5 | Inv 6 |
|---|---|---|---|---|
| MALA:PIB (molar ratio) | 1.8 | 1.8 | 1.8 | 2.0 |
| Reaction Temp/Time (° C./hrs.) | 230/5 | 230/5 | 230/5 | 230/5 |
| Phenothiazine (in MALA) (ppm) | 0 | 80 | 80 | 80 |
| Sulfonic Acid (at t = 0) | 25 | 25 | 0 | 25 |
| Sulfonic Acid (at t = 2.25) (ppm) | 75 | 75 | 0 | 75 |
| Sediment (wt. %) | 0.08 | <0.005 | Trace | <0.01 |
| Visual Reactor Fouling (%) | 16 | 3 | 3 | 3 |
| SAP (mgKOH/g) | 55.4 | 52.4 | 51.1 | 55.7 |
| AI (mass %) | 83.5 | 85.5 | 80.9 | 88.3 |

The disclosures of all patents, articles and other materials described herein are hereby incorporated, in their entirety, into this specification by reference. A description of a composition comprising, consisting essentially of, or consisting of a plurality of defined components should be construed to further include compositions that result from the admixture of said defined components. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A process for producing an ene reaction product comprising thermally reacting at a temperature above about 180° C., and without halogen assistance, polymer consisting of polyalkene selected from the group consisting of polyisobutene, polybutene and mixtures thereof, having a number average molecular weight (Mn) of from about 300 to about 5000, and a terminal vinylidene content of at least 30%, and an enophile, in the presence of from about 10, to about 3000 ppm by weight, based on the weight polyalkene, of free radical inhibitor comprising a phenothiazine nucleus.

2. The process of claim 1, wherein said polyalkene has a terminal vinylidene content of at least about 50%.

3. The process of claim 1, wherein the reacting group of said enophile is olefinic or carbonyl.

4. The process of claim 1, wherein said polyalkene has a $M_n$ of from about 900 to about 2500, and said enophile is maleic anhydride (MA).

5. The process of claim 4, wherein said free radical inhibitor comprises unsubstituted phenothiazine.

6. The process of claim 4, wherein the MA and the polyalkene are reacted in a molar ratio (MA:polyalkene) of from about 0.9 to about 3:1.

7. The process of claim 6, wherein said cue reaction product has a functionality of from about 1 to about 2.

8. The process of claim 7, wherein said ene reaction product has a functionality of from about 1.3 to about 1.7.

9. The process of claim 4, wherein the reaction is conducted in the further presence of from about 10 to about 2000 ppm by weight, based on the weight of the polyalkene, of an oil soluble sulfonic acid.

10. The process of claim 9, wherein at least 50 wt. % of the sulfonic acid is introduced after at least 50% of the polyalkene has reacted with the MA.

11. A process for producing an one reaction product comprising thermally reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), in the presence of from about 10, to about 3000 ppm by weight, based on the weight polyalkene, of free radical inhibitor comprising a phenothiazine nucleus, wherein the reaction is conducted at a temperature of from about 180 to about 260° C., and under a pressure of from greater than 0 to about 1000 kPa, and said MA is contacted with said polyalkene such that an initial charge of MA is contacted with the polyalkene at or prior to the beginning of the reaction, and one or more additional charges of MA are introduced into the resulting reaction mixture subsequent to the beginning of the reaction.

12. A process for producing an ene reaction product comprising thermally reacting at a temperature above about 180° C., and without halogen assistance, polymer comprising polyalkene selected from the group consisting of polyisobutene, polybutene and mixtures thereof having a number average molecular weight (Mn) of from about 900 to about 2500, and a terminal vinylidene content of at least 30%, and maleic anhydride (MA), in the presence of from about 10, to about 3000 ppm by weight, based on the weight polyalkene, of free radical inhibitor comprising a phenothiazine nucleus, comprising the additional steps of:

(a) cooling the reaction mixture to below 200° C. after completion of the reaction;

(b) introducing an additional amount of from about 1 to about 10 wt. %, based on the weight of the reaction mixture, MA into the reaction mixture and stirring for a period of from about 0.5 to about 6 hours;

(c) stripping the reaction mixture of excess MA;

(d) adding a hydrocarbon solvent; and (e) filtering the reaction mixture.

13. The process of claim 4, further comprising reacting the ene reaction product with a nucleophilic reactant.

14. The process of claim 13, wherein said nucleophilic reactant is selected from the group consisting of amine, alcohol, amino-alcohol, metal compound, and mixtures thereof.

15. The process of claim 14, wherein said nucleophilie reactant is a polyamine.

16. The process of claim 13, wherein the reaction product is reacted with the nucleophilic reactant in diluent oil that is at least substantially free from sulfur.

* * * * *